May 28, 1957   E. A. FUGLIE ET AL   2,793,868
CARRIER CART PROVIDED WITH STAIR CLIMBING ENDLESS TREADS
Filed Oct. 30, 1950   3 Sheets-Sheet 1
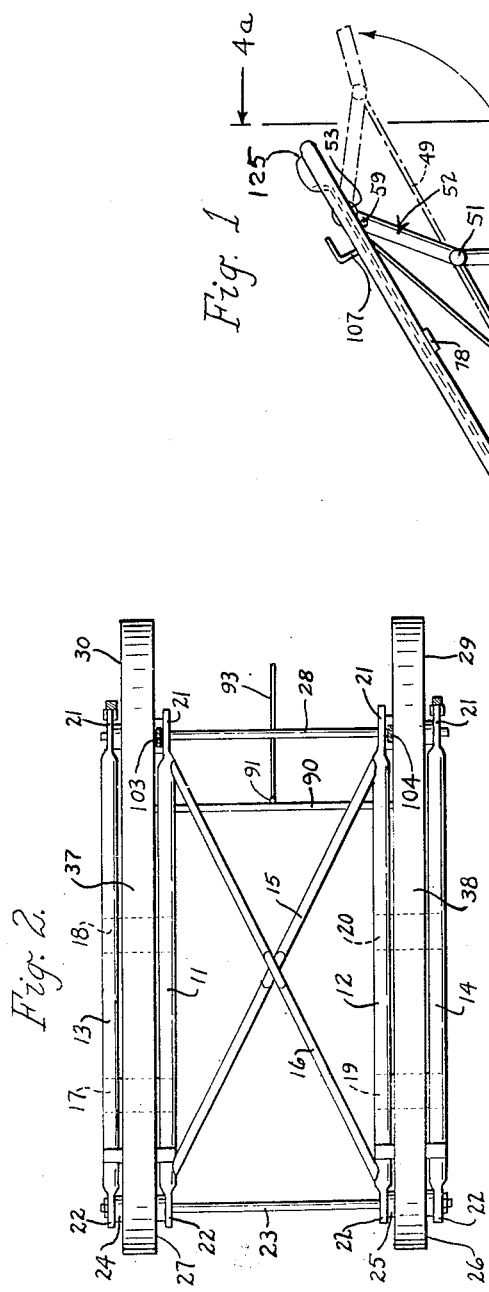
INVENTORS
CARL E. WEINMANN
ELMER A. FUGLIE
BY Whiteley & Caine
ATTORNEYS May 28, 1957  E. A. FUGLIE ET AL  2,793,868
CARRIER CART PROVIDED WITH STAIR CLIMBING ENDLESS TREADS
Filed Oct. 30, 1950  3 Sheets-Sheet 2
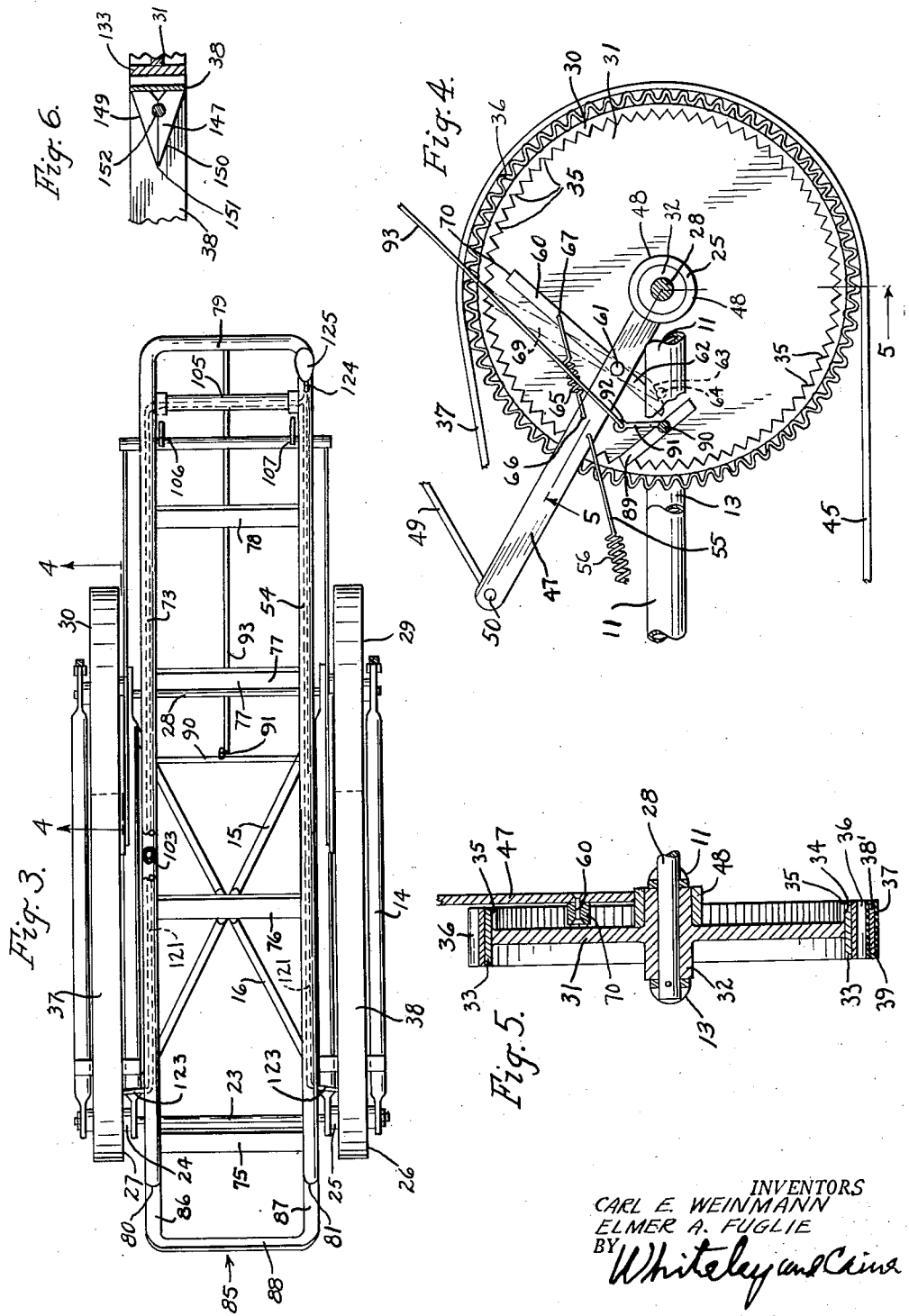
INVENTORS
CARL E. WEINMANN
ELMER A. FUGLIE
BY 
ATTORNEYS.

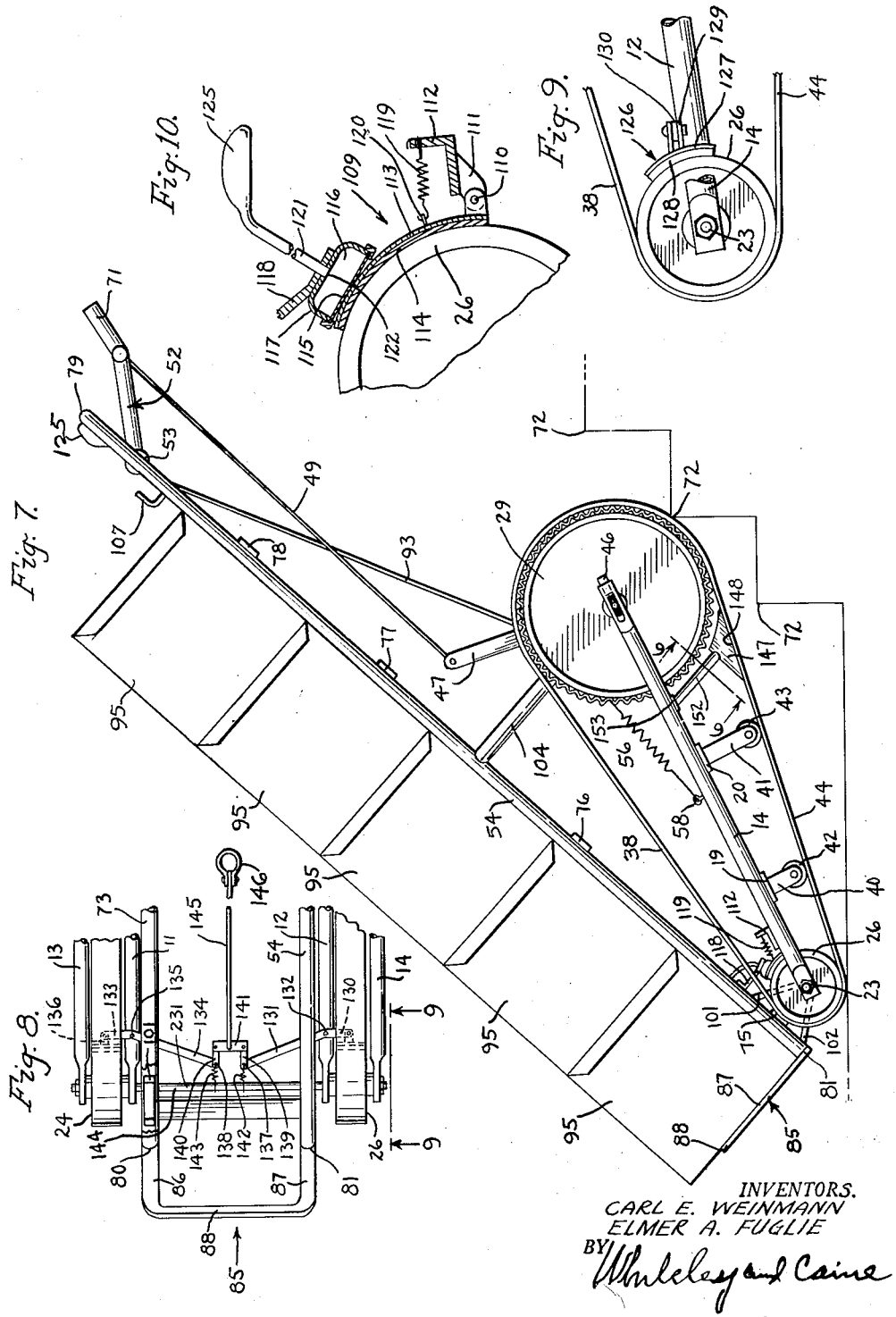

United States Patent Office 2,793,868
Patented May 28, 1957

2,793,868

CARRIER CART PROVIDED WITH STAIR CLIMBING ENDLESS TREADS

Elmer A. Fuglie and Carl E. Weinmann, Winona, Minn., assignors to Winona Tool Manufacturing Company, Winona, Minn., a partnership Application October 30, 1950, Serial No. 192,876

2 Claims. (Cl. 280—5.22)

Our invention relates to a carrying cart, particularly adapted to be used in carrying cases of soft drinks and beer where the movement must be over stairs, and has for its object to provide a cart having supporting wheels, one set large and one set small, and a band connecting them together with means for rotating or braking the wheels as desired in elevating a load of cases up or taking them down sets of stairs.

An object of the invention is to provide a stair climbing cart for transporting objects up a flight of stairs embodying novel means for propelling the cart in such a manner that it cannot backslide while carrying a load.

Another object is to provide a cart for transporting heavy objects up and down a stairway, embodying a cart frame for supporting the objects, two sets of wheels disposed on either side of the frame with an endless belt trained over each set of wheels, with a propelling means acting on the forward set of wheels as the cart ascends the stairway, and a braking mechanism acting on the forward set of wheels as the cart descends a stairway.

A further object is to provide a cart for transporting heavy objects in either direction relative to a stairway, embodying a frame for supporting the objects, a large set of wheels at one end of the frame and a small set of wheels at the other end of the frame with an endless belt trained over two wheels on each side of the cart, provided with a gear and a pawl arrangement connected with the large wheels to propel the cart upwardly and prevent backsliding during the movement up a stairway, together with braking means cooperating with the smaller wheels for controlling the movement of the cart downwardly relative to the stairway to thereby provide safe controlled movement of the cart in either direction relative to the stairway.

The full objects and advantages of our invention will appear in the detailed description thereof given in the following specification and the novel features of the invention by means of which the aforesaid advantageous and improved results are obtained will be particularly pointed out in the claims.

In the drawings illustrating an application of our invention in one of its forms.

Fig. 1 is a side elevation view of the apparatus when rested on level ground.

Fig. 2 is a top plan view taken on line 2—2 of Fig. 1.

Fig. 3 is a top plan view of the entire apparatus.

Fig. 4 is an enlarged sectional longitudinal elevation view of the inside of one of the large wheels taken on line 4—4 of Fig. 3 showing connected parts.

Fig. 4a is a plan view taken on line 4a—4a of Fig. 1 of the upper rear end of the case-carrying platform.

Fig. 5 is a sectional view taken on line 5—5 of Fig. 4.

Fig. 6 is a detailed top plan view of a tone protector in section on line 6—6 of Fig. 7 in relation to the belt shown in side elevation in Figs. 1 and 7.

Fig. 7 is a side elevation view of the apparatus carrying a load shown as it is starting to be moved up a set of stairs.

Fig. 8 is a plan view of the front end of the frame above the small wheels showing connections for manually operating a mechanical brake.

Fig. 9 is a side elevation view with some parts broken away taken along line 9—9 of Fig. 8.

Fig. 10 is a sectional elevation view showing the manner of applying a hydraulically operated brake to the small wheels, as shown in position in the lower left hand part of Fig. 7.

Referring particularly to Figs. 1, 2 and 3, a bottom framework is formed of pairs of inside frame members 11 and 12 and outside frame members 13 and 14. A pair of these frame members each consisting of an inside and an outside frame member are spaced apart for a purpose hereinafter given. The inside frame members 11 and 12 are connected by a pair of diagonal strut bars 15 and 16.

The pair of frame members 11 and 13 are secured together by transverse plates 17 and 18, shown principally in dotted lines in Fig. 2. Similarly the pair of frame members 12 and 14 are secured together by transverse plates 19 and 20. This arrangement makes a rigidly interconnected frame.

The members 11, 12, 13 and 14 may advantageously be made of tubular material with their several ends flattened, as indicated at 21 and 22 for each of the members.

A front axle 23 is journalled in bearings 24 and 25 which are secured between the frame members 11, 13 and 12, 14 respectively. A small wheel 26 is mounted on the end of axle 23 between frame members 12 and 14 and small wheel 27 is mounted on axle 23 between frame members 11 and 13.

At the rear of the frame above described is a second axle 28. A second set of wheels 29 and 30 are mounted on the ends of axle 28, to operate between the spaced outer parts of the pairs of frame members 11, 13 and 12, 14, respectively. Wheels 29 and 30 are much larger in diameter than wheels 26 and 27. In fact, as shown, and in a preferred form, the wheels 29 and 30 will be in round numbers three times the diameter of wheels 26 and 27.

These large wheels are an important part of our invention. The external elevation view is shown in Figs. 1 and 7. The internal construction of the wheels is shown in Figs. 4 and 5. It is to be observed that the construction and operation of wheel 30 is identical with that of wheel 29. Each of these wheels comprises a central solid disk portion 31, a hub 32 and a outer annular rim 33, as clearly shown in Fig. 5.

On the inside of the inner part 34 of rim 33 is formed an annular set of ratchet teeth 35, as clearly shown in Figs. 4 and 5. Upon the outside of rim 33 is positioned and held in place with a press fit a corrugated tire 36.

A belt 37, shown in Fig. 2 and Fig. 3, runs over the small wheel 27 and the large wheel 30. A similar belt 38, likewise shown in Figs. 2 and 3 and in Fig. 1 and Fig. 7, runs over wheels 26 and 29. Referring to Fig. 5, belts 37 and 38 comprise an inner layer 38' of strip flexible metal to which is secured an outer layer 39 of rubber. The metal layer gives the belt strength, and the rubber layer gives it traction, effective particularly where the belt is contacting the edges of stair treads going up or down stairways.

Referring to Fig. 1 and Fig. 7, on the plates 19 and 20 connecting spaced frame bars 12 and 14 are secured outwardly extended forked brackets 40 and 41 in the forked ends of which are mounted rollers 42 and 43 respectively. These rollers are positioned to hold the lower run 44 of belt 38 moving in a fixed line or plane to resist pressures in a single line across the belt as when the apparatus is being moved upstairs supported by contact of the belt with the edges of the stair treads. The same support is given to the lower run 45, Fig. 4, of the belt 37 running over rollers 27 and 30.

It will be understood that, considering the fact that the lower runs 44 and 45 of belts 38 and 37 respectively have to support the case carrier and its load of cases against the edges of stair treads in going up or down stairs, it is necessary that the belts be held tight on the rollers. To effect this belt tightener means, preferably a threaded bolt such as indicated at 46 in Figs. 1 and 7, are mounted on the ends of frame members 13 and 14, and by these means the wheels 26 and 29 and wheels 27 and 30 are moved apart to bring the belts into a sufficiently tightened condition.

Means for rotating the large wheels 29 and 30 is shown in detail in Figs. 4 and 5, also in Fig. 1. A swinging lever 47 has a hub 48 journalled on the inside portion of the hub 32 of the wheels 29 and 30. This lever is connected by a rod member 49, which is journalled at 50 to the lever 47 and journalled at 51, see Fig. 4a, to a lever indicated by general reference numeral 52 which in turn is journalled at 53 to a cross bar 53' connecting frame members 54 and 73 hereinafter described.

Referring again to Fig. 4, the lever 47 has connected therewith through an extension rod 55 a spring 56. As shown in Figs. 1 and 7, the spring 56 is connected at 57 with an eye member 58 fast on the frame member 14.

The spring 56, therefore, at all times tends to hold the lever 47 in its forwardly extended position, as indicated in Figs. 4 and 1.

The lever 52 is swung on its pivot at 53 by moving handle 71 to the rearward position shown in Fig. 7 and in dotted lines in Fig. 1. Further swinging of the lever 47 is prevented by stop pins 59 on lever 52 which will engage the frame members 54 and 73, as shown in Fig. 1 and in Fig. 4a.

Referring again to Fig. 4, a pawl member 60 is pivoted at 61 to the lever 47. The pawl member has an end portion 62 extending beyond the pivot 61, which end portion is provided with a cam face 63 adapted to engage pins 64 extending outwardly from frame members 11 and 12.

The spring 65, Fig. 4, is pivotally connected at one end 66 with an inner portion of the lever 47 and at 67 with the pawl 60 and normally tends to move the pawl into engagement with the walls of ratchet teeth 35. Except when prevented from doing so by contact of the cam end 63 of lever extension 62 with the outwardly extending pin 64, the spring 65 will bring the pawl 60 into the dotted line position indicated at 69, which brings its end 70 into engagement with the ratchet teeth 35.

The arrangement is such that normally the spring 56 pulls the lever 47 into the full line position of Fig. 1. This brings the cam end 63 of pawl 60 against the pin 64 which holds the pawl 60 out of contact with the ratchet teeth 35. When, however, the lever 47 is swung upwardly by operation of the lever 52 effected through handle 71, the pawl 60 is permitted to swing so its end 70 comes into engagement with one of the ratchet teeth 35, the swinging being effected by the spring 65.

When lever 52 has been swung into the position of Fig. 7, the lever 47 will be swung into the position of Fig. 7, and the pawl 60 will have effected a substantial rotation of the wheels 30 and 29, which is transmitted through frictional pull of belts 37 and 38 on the outer points of corrugated teeth 36 to effect a forward movement of lower run 44 of belt 38 and run 45 of belt 37.

This operation, of course, extends the springs 56 and when the handle 71 and lever 52 either are released or are moved backwardly under control of the hand, the spring 56 will effect movement of lever 47 to the position shown in Fig. 4, at which time the pin 64 engages the cam end 63 of pawl 60 and will have caused the pawl 60 to go to its inoperative position of Fig. 4.

Each time the lever 47 is so operated it will rotate the wheels 29 and 30 a desired distance, so by merely swinging the lever 52 out and back successively and with a reasonable degree of rapidity, the large wheels 29 and 30 will be rotated substantially continuously and the forward movement of lower run 44 of belt 38 and run 45 of belt 37 contacting the stair edges 72 will cause the case-carrier and its load of cases to move smoothly and without effort up the stairs.

When going up a stair, it is necessary or desirable to lock the large wheels 29 and 30 against reverse movement while the lever 47 is returned to initial position. This is effected by means of a pawl 89 which is rigidly held on a shaft 90 which is journalled to rotate in bearings in the frame members 12 and 14.

The pawl 89 and the shaft 90 are so positioned that when the lever 47 is in the position shown in Fig. 4 the end portion 62 of pawl 60 will extend into contact with the lower end of pawl 89 to hold the upper end of pawl 89 out of contact with the ratchet teeth 35. When the lever 47 is swung upwardly by the operation of the lever 52, the end portion 62 of the pawl 60 is taken out of contact with pawl 89. This permits a spring, which is not indicated in the drawings, to draw the upper end of pawl 89 into contact with the ratchet teeth 35. Thus, during the time when lever 52 is swung into the position of Fig. 7 and pawl 60 is effecting a substantial rotation of the wheels 30 and 29, pawl 89 will be in the position shown in Fig. 4 and there will be a ratchet action between the pawl 89 and the ratchet teeth 35. However, during the time when the lever 52 and the pawl 60 are returned to their initial position as shown in Fig. 4, the pawl 89 in engagement with the ratchet teeth 35 will effectively hold the wheels 29 and 30 from rotating in the forward direction. This prevents any slipping or loss of movement in moving the carrying cart up a flight of stairs.

It is possible that the end portion 62 of pawl 60 will be unable to force the pawl 89 from its position in contact with the ratchet teeth 35 when the upward movement of the cart has been completed. In such a contingency a manual means consisting of an arm 91 secured to the shaft 90 and connected at 92 to a steel cable 93, has been provided to disengage pawl 89 from contact with the ratchet teeth 35. Thus if cable 93, which extends to a point near the operating handle 79, is pulled upward, the shaft 90 will be rotated and this will rotate pawl 89 out of contact with the ratchet teeth 35 and this will permit end portion 62 of pawl 60 to move into holding position so that pawl 89 is not in contact with the ratchet teeth 35 except during the upward movement of the carrying cart.

To form the case-carrier platform a pair of support rods 54 and 73, see Fig. 3, are held in parallel relation by a series of transverse members 75, 76, 77 and 78. At their upper rear ends the members 73 and 54 are united in a transverse member 79 which in practice will be used as an operating handle.

Secured to the lower forward ends 80 and 81 of the frame members 73 and 54 are the parts of a U-shaped bracket designated generally by the numeral 85. The arms 86 and 87 of the bracket 85 are secured by welding or otherwise to the free ends 80 and 81 of the frame members 73 and 54. The top cross bar 88 is thus held in the upright position indicated in Figs. 1 and 7. This forms a lower support for the cases generally designated as 95, Fig. 7, except the two top cases which are designated as 95a and 95b.

The members 73 and 54 are rigidly united together and held in fixed parallel relation by the transverse bar members 75, 76, 77 and 78. This framework is supported upon the front axle 23 by pairs of angularly disposed bars 101 and 102 which connect axle 23 directly below each support members 73 and 54, as indicated in Figs. 1 and 7 and broken away in Fig. 8. This means of supporting the end of the case-carrying framework brings its front end low down close to the top plane of the small wheels 26 and 27.

As shown in Figs. 1 and 7, the case-carrying frame is supported upon rear axle 28 in an angularly rising position by a pair of strong supporting members 103 and 104 connected to the frame members 73 and 54 respectively. The supports 103 and 104, as clearly indicated in Figs. 2 and 3, are attached to the case-carrying framework at a point near the center of gravity of its load when five cases are employed, as shown in Fig. 7.

The chief part of the load is, therefore, transmitted to axle 28 having thereon the large wheels 29 and 30. This effectively balances the load on the case-carrying platform and distributes its pressure quite evenly over the bottom run 44 of the belt 38 and the bottom run 45 of the belt 37.

As heretofore stated, it is desirable or necessary, in going up or down stairs, to have means for applying braking action effective upon the entire case-carrier.

We have provided two types of braking means either of which will be satisfactory. The preferred form of brake is a manually operated hydraulic brake. However, a strictly mechanical form of brake is practical, and either one may be substituted for the other.

As best indicated in Fig. 10, to the rim of the wheels 26 and 27 is applied a brake member 109. This member is pivoted at 110 to a downwardly extending arm 111 on an angle iron member 112 extending between the sets of supports 12 and 14, 11 and 13 respectively. Although the braking means may be applied to only one wheel, in practice the braking of both wheels will be most effective.

As shown in Fig. 10, the brake member, designated generally 109, comprises an outer metal shell 113 and an inner braking pad 114, both being curved in the arc of a circle substantially that of the rim of the wheel 26 (or 27). The outer shell 113 near its free end contacts a diaphragm 115 spanning an air chamber 116 formed inside of a cup 117 composed of metal or other rigid material. This cup is supported upon a bracket 118, see Fig. 7, which is secured to case-carrying frame member 54 (or 73).

The two brake members are operated simultaneously by hydraulic pressure exerted by means hereinafter described, including tubes housed within tubular frame members 54 and 73 and the cross bar 53', the tubes being united together at the bulb 125, see Fig. 3.

Referring again to Fig. 10, a spring 119 is connected with bracket 112 and at 120 with an eye piece fast on brake shell 113. This spring normally holds the pivoted frame member 109 so the diaphragm 115 is pressed inwardly and no braking action is exerted on the rim of the wheel 26 (or 27). Tubes 121 enter chambers 116 at 122.

As shown in Fig. 1 and Fig. 3 at 123, the tubes 121 enter the support members 54 and 73 near the front axle 23 and extend within said support members to the point 124 in Fig. 3 where they join with a hand bulb 125 lying on the outside of the member 54 in convenient position to be compressed by the operator's hand against said member.

The result of such hand pressure exerted against the entire considerable area of the diaphragms 115 through the fluid that fills the system, including the chamber 116 and hand bulb 125, is to rock the brake members 109 upon pivots 110 with sufficient force to cause the brake linings 114 to grip and hold stationary the wheels 26 and 27 thus stop any movement in either direction of the lower run 44 of belt 38 and the lower run 45 of belt 37.

An entirely mechanical way of effecting a braking action is shown in Figs. 8 and 9. This differs from that heretofore described primarily in that the brake is not hydraulically actuated. As shown in Fig. 9, a brake member 126 having an outer rigid shell 127 and an inner braking member 128 engages the rim of wheel 26. An exactly similar brake member engages the rim of the other small wheel 27. Thus braking action is simultaneously applied to the small wheels 26 and 27.

As shown in Fig. 8, the brake member 126 is provided with a form 129, Fig. 9, on which is pivoted the short end 130 of a lever 131, pivoted at 132 to the frame member 12. A similar short end 133 of a lever 134 is pivoted at 135 to the frame member 11, and the short end 132 in turn is pivoted at 136 to a brake member, not shown, which is identically the same as the brake member 126 shown in Fig. 9, and is connected to short arm 135 in the same way.

The two levers 131 and 134 are pivotally connected at 137 and 138 to arms 139 and 140 and in turn connected with a cross piece 141. Springs 142 and 143 are connected to a cross member 144 and normally rock the brakes 126 applied to the two small wheels 26 and 27 out of braking action.

A cord 145, Fig. 8, is connected to the cross piece 141 and extends rearwardly to a point near the upper rear end of the case-carrying platform to a ring 146, conveniently positioned for either holding the member 145 or being used by the hand to pull on the cross piece 141 and actuate the mechanical brakes 126 into braking action simultaneously against the two brakes on the two wheels 27 and 26.

To prevent large stonges or other members from coming between the lower runs 44 and 45 of belts 38 and 37 and the perimeter of the large wheels 29 and 30, we provide a stone guard, well shown in Figs. 6 and 7. This embodies a V-shaped guard member 147 which, as shown in Fig. 7, has a lower face 148 which engages the inner surface of the runs 44 and 45 of belts 38 and 37, and which has side walls 149 and 150 diverging outwardly from an apex 151 both laterally and upwardly. This guard is carried upon a rod 152 which is rigidly connected at 153 with the frame members 14. A similar arrangement, not shown, is provided for connection with the frame member 13.

This arrangement effectively moves away from the contacting path of runs 44 and 45 of belts 38 and 37 with the corrugated tire 36 any large sized stones, pieces of gravel or the like, which otherwise might get between the belt and the corrugated tire and cause damage.

The hydraulically operated brake heretofore described is the preferred form of braking device. Yet the mechanical brake last described will be effective for the purpose, and either will operate satisfactorily and is within the scope of our invention. It will be noted that both are controlled in operation manually by the operator adjacent the upper rear end of the case-carrying platform and its load.

The principal advantage of our invention resides in the provision of a carrying cart that may be readily propelled on a flat or plane surface and which may also be used to transport objects in both directions relative to a stairway, and wherein movement of the cart in either direction on the stairway is under control of the operator, and in ascending a stairway provisions made to prevent the cart from backsliding down the stairway.

Another advantage resides in the use of propelling means for moving the cart upwardly on a stairway to prevent backsliding down the stairway.

A further object is in the provision of a cart provided with endless belts for transporting heavy objects in both directions relative to a stairway, embodying propelling means acting on the front end of the cart as it ascends the stairway and braking means acting on the front end of the cart as it descends the stairway.

We claim:

1. A stair-climbing cart, comprising a cart frame, an axle journalled on said frame, a rotatable supporting member journalled on said axle to support said cart frame for movement, a gear secured to said supporting member, a lever journalled on said axle at one side of the gear for reciprocating movement between first and second positions, a pawl pivotally mounted on said lever for movement relative thereto and adapted to engage the teeth on said gear on movement of the lever from its first position to its second position to rotatably advance the supporting member, stationary stop means secured to the cart frame and adapted to engage said pawl when the lever is in its first position for biasing the pawl out of engagement with the teeth of said gear, resilient means secured between said lever and said pawl for normally biasing the pawl in the direction of the gear teeth when the lever is moved in the direction of its second position, another resilient means secured between said lever and said cart frame biasing the lever in the direction of its first position and holding the pawl in engagement with the stop means and away from the teeth of said gear when the lever is in its first position, and a second pawl supported by the cart frame for pivotal movement relative to the teeth of said gear and adapted to engage the gear teeth when the lever is moved in the direction of its second position to prevent reverse movement of the gear when said lever is moved from its second position in the direction of its first position.

2. A cart for conveying a load relative to a stairway, comprising a cart frame formed with a load engaging platform at one end and a handle portion at the other end, a first pair of laterally spaced wheels supported on said frame adjacent the platform, an axle extending transversely to the frame and journalled on the frame in spaced relationship to the first pair of wheels, a second pair of wheels journalled on either end of said axle, said second pair of wheels formed of a larger diameter than the first pair of wheels, a continuous belt disposed on each side of the frame and circumscribing a wheel of each pair of wheels and forming an endless track on each side of the frame for supporting the cart frame for movement, means for ascending a flight of stairs including a gear journalled on said axle and connected to one of the second pair of wheels, a lever journalled on said axle at one side of the gear and adapted for reciprocating movement relative to said gear, a pawl pivotally mounted on said lever and adapted to engage the teeth on said gear on movement of the lever from its first position to its second position, said lever forming a driving means operative on the front end of the endless tracks in ascending a flight of stairs, a brake operably connected to at least one wheel of the first pair of wheels and operative on the front end of the endless tracks in descending a flight of stairs, and manually operable means extending from said lever and said brake to the handle portion of the cart frame for controlling the movement of said endless tracks from the handle portion of the frame.

References Cited in the file of this patent

UNITED STATES PATENTS

| Number | Name | Date |
|---|---|---|
| 343,484 | McKeon | June 8, 1886 |
| 376,703 | Bedell | Jan. 17, 1888 |
| 532,298 | Wallace | Jan. 8, 1895 |
| 536,261 | Booth | Mar. 26, 1895 |
| 902,794 | Anderson | Nov. 3, 1908 |
| 1,010,835 | Whalton | Dec. 5, 1911 |
| 1,106,913 | Badger et al. | Aug. 11, 1914 |
| 1,119,068 | Compton et al. | Dec. 1, 1914 |
| 1,261,944 | Layton et al. | Apr. 9, 1918 |
| 1,375,183 | Saunders | Apr. 19, 1921 |
| 1,551,127 | Whyel | Aug. 25, 1925 |
| 1,701,188 | Miller | Feb. 5, 1929 |
| 2,029,096 | Doyle | Jan. 28, 1936 |
| 2,055,860 | Faries et al. | Sept. 29, 1936 |
| 2,132,069 | Hall | Oct. 4, 1938 |
| 2,165,603 | Yeats | July 11, 1939 |
| 2,214,311 | Stevens | Sept. 10, 1940 |
| 2,246,147 | Smith | June 17, 1941 |
| 2,393,807 | Pinion et al. | Jan. 29, 1946 |
| 2,422,254 | Peronti | June 17, 1947 |
| 2,488,766 | De Moss | Nov. 22, 1949 |
| 2,494,065 | Slemmons | Jan. 10, 1950 |
| 2,633,363 | Marshall | Mar. 31, 1953 |

FOREIGN PATENTS

| 187,291 | Germany | June 24, 1907 |